United States Patent [19]
Forrest

[11] 3,969,565
[45] July 13, 1976

[54] CARD CLOTHING METHOD FOR TREATING THERMOPLASTIC SHEET MATERIAL

[76] Inventor: Norman Forrest, 216 Byram Road, Byram, Conn. 10573

[22] Filed: Mar. 26, 1975

[21] Appl. No.: 562,386

[52] U.S. Cl. .............................. 264/284; 264/119; 264/156; 264/288
[51] Int. Cl.² ......................................... B29D 7/14
[58] Field of Search ........... 264/119, 156, 280, 284, 264/288

[56] References Cited
UNITED STATES PATENTS

| | | |
|---|---|---|
| 2,949,639 | 8/1960 | Woodward.......................... 264/288 |
| 3,137,611 | 6/1964 | Krolik............................. 264/156 X |
| 3,255,064 | 6/1966 | Makansi.......................... 264/119 X |
| 3,354,022 | 11/1967 | Dettre............................. 264/284 X |
| 3,496,260 | 2/1970 | Guenther.......................... 264/156 |

*Primary Examiner*—Richard R. Kucia
*Attorney, Agent, or Firm*—Lawrence Rosen; E. Janet Berry

[57] ABSTRACT

The use of carding technology to produce a patterned sheet of thermoplastic material which comprises pressing thermoplastic sheet material between rotating cylinders, rollers or endless belts covered with card clothing having a surface of metallic wires. The rotating carding means are provided with internal heating means for maintaining the surface wires at elevated temperatures.

13 Claims, 4 Drawing Figures

CARD CLOTHING METHOD FOR TREATING THERMOPLASTIC SHEET MATERIAL

The present invention relates to a method of manufacturing a flexible or rigid patterned sheet of thermoplastic material utilizing carding technology. More particularly, the invention pertains to a continuous method for treating thermoplastic sheet to achieve repetitive patterned surfaces by pressing the thermoplastic sheet, which is preheated to a temperature above its heat softening temperature, onto a rotating surface provided with card clothing.

BACKGROUND OF THE INVENTION

In the textile industry raw fibers are subjected to a carding process in order to open fiber bundles, remove tangles, and disperse them into a uniform web. The historical development of carding technology as well as the present day usages is described by W. Edwin Sauer in "Formed Fabrics Industry" Volume 5, Number 10, October, 1974, pages 38 to 44. Further background on carding technology and carding machines is provided by U.S. Pat. Nos. 1,015,202; 2,513,299; 2,703,439; and 3,654,667. As far as it is known the carding technology has not be utilized for the treatment of plastic sheet material. This is not surprising since one would have expected that the use of such procedures and machinery would shred or otherwise destroy the sheet like nature of the plastic feed material.

A variety of processes and equipment have been described heretofore in the art concerning the manufacture of thermoplastic sheets having patterned surfaces. These processes have involved such features as molding, perforating, pile formation and the like to obtain the desired patterns in the thermoplastic sheet products. Some of the representative patents in this art include U.S. Pat. Nos. 2,924,863; 3,027,595; 3,317,644; 3,399,425; and 3,696,183. Many of these processes have the disadvantages of requiring relatively expensive machinery and/or surface modification equipment which not only is expensive but which is incapable of being readily changed in order to vary the desired patterns. In other words such prior art processes lack the flexibility required to produce different patterns in the thermoplastic sheet material without incurring prohibitive expenses. It would be desirable therefore to have available a process for producing patterned thermoplastic sheets by the use of molding surfaces which are not only relatively inexpensive but which may also be readily modified to obtain varied patterns.

One object of the invention is to provide a novel process for producing patterned sheets of thermoplastic material.

Another object of the invention is to provide a high speed, continuous process for modifying thermoplastic sheet material to obtain patterned, decorative surfaces.

A further object of the present invention is to provide a process whereby carding technology and carding equipment can be effectively employed in the treatment of thermoplastic sheet material for the obtention of repetitive patterns.

A still further object is to provide a process for continuously subjecting polyvinyl chloride sheet to pressing between continuously rotating means covered with card clothing to obtain a non-perforated or perforated patterned polyvinyl chloride sheet product.

These and other objects of the present invention will become readily apparent from the ensuing description and illustrative embodiments.

In accordance with the present invention it has now been found that thermoplastic sheet material such as polyvinyl chloride sheeting can be patterned by utilizing procedures and equipment employed in the carding of fibers provided that the thermoplastic sheet feed material is maintained at a temperature above its softening point while being pressed by the cooperating card clothing surfaces having surface wires maintained at elevated temperatures. It is another important feature of the present invention that the thermoplastic sheet be maintained during processing on the rotating cylinder to which it is fed and not stripped off by the rotating cooperative means which is also covered by card clothing thereby enabling the pressed sheet to be cooled on the rotating cylinder. This is accomplished by having the wires on the two carding surfaces point in the same or different directions and by having the wires on the upper cylinder set between the spaces of the wires on the cooperating or bottom surface. The present invention does require that the surface wires on the carding means be kept at somewhat elevated temperatures. It will be understood however that each surface may be maintained at either the same or different temperatures. The foregoing features will be discussed below in greater detail.

The flexible sheeting material which may be processed in accordance with the process of this invention may be composed of such thermoplastic polymers as plasticized polyvinyl chloride, low or medium density polyethylene, polypropylene, ethylene-vinyl acetate copolymers, vinylidene chloride, polyamides, polyesters, thermoplastic polyurethanes, and similar polymeric and copolymeric materials. In some instances the thermoplastic sheeting material may be backed or laminated with a material such as a non-woven or knitted fabric which is capable of being stretched in two directions from its axis. The thickness of the feed thermoplastic material is not critical, although in general its thickness will vary from about 0.002 to 0.060 inch, and preferably from about 0.004 to 0.010 inch. It will be understood that the thermoplastic sheeting may be supplied to the carding equipment from a roll of thermoplastic film and preheated prior to compression. An alternative method would be the thermoplastic sheet may be fed directly from an extruder which then furnishes the necessary preheating. Obviously a combination of these procedures can also be employed. The preheating can be accomplished by utilizing hot air blowers, radiant heaters, or the like. For most purposes it will be necessary to preheat the thermoplastic sheet prior to compression to a temperature at which the thermoplastic material will become soft, i.e., its heating softening temperature. In many instances, the thermoplastic feed material is heated to near its liquidus temperature to destroy the memory imparted by prior processing. This temperature will of course vary depending upon the nature of the thermoplastic material. With polyvinyl chloride sheeting, for example, the heating softening temperature is about 385° to 400°F.

In carrying out the process of this invention it is important, as pointed out above, to have the surface wires on the carding surfaces at somewhat elevated temperatures. The exact temperatures employed will vary with the type of thermoplastic material being treated, but in general it has been found essential to maintain the surface wires of at least one of the carding means at a temperature approximately equivalent to or below the heat softening temperature of the thermoplastic material. The temperatures of the surface wires can range from about 110° to 280°F., preferably from about 140° to 200°F., when utilizing a thermoplastic polymer such as polyvinyl chloride. Although the temperature of the surface wires on both of the carding surfaces may be the same, they may also differ. In the latter situation, for example, the cylinder, roller or endless belt means which serves as the molding surface may be maintained at the higher temperature, whereas the surface wires on the rotating cooperative means may be lower. Thus, with polyvinyl chloride sheeting the surface wires on the rotating cylinder may be within the range of about 120° to 280°F. and the surface wires on the rotating cooperative means may have a temperature within the range of about 110° to 280°F.

After the preheated thermoplastic sheeting is compressed between the nip formed by the two rotating carding means to form the desired patterned surfaces and passes out of the contact or nip zone it is cooled to a temperature below the softening point of the thermoplastic material. This cooling step can be accomplished by blasts of cold air or by keeping the internal temperature of the top cylinder or roll at a temperature of about 120° to 200°F. or any conventional cooling means. The cooled compressed thermoplastic sheeting is then parted or separated from the rotating cylinder in a continuous manner by the use of a conventional take-off roll, doffer or brush roll, to reach under the wires to strip the thermoplastic sheet. The take-off roll may also be cooled internally.

The invention will be more fully understood by reference to the following illustrative embodiments and the accompanying drawings in which.

Figure 1:
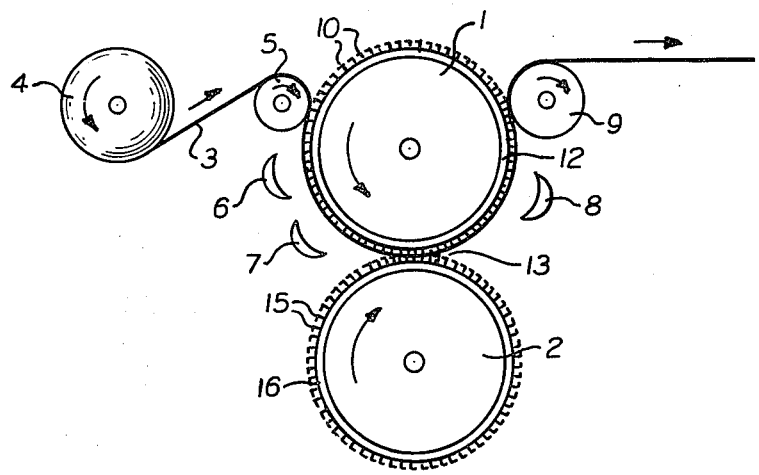
FIG. 1 is a schematic representation of an apparatus for continuously producing a non-perforated, patterned thermoplastic sheeting in accordance with the preferred embodiments of this invention.

The arrows in the drawings indicate the direction in which the thermoplastic sheet travels as well as the rotational direction of the various rollers and endless belts.

Referring to these drawings, FIG. 1 illustrates apparatus for treating thermoplastic sheeting by the process of this invention to produce a non-perforated, patterned thermoplastic sheet product in a continuous manner. The apparatus includes a feed roller 4 carrying a preformed roll of polyvinyl chloride sheeting 3, which is passed over roller 5 and fed directly against the outer surface of cylinder or roller 1. Cylinder 1 is power driven (not shown) and is hollow thereby permitting it to be supplied with a heating fluid (not shown) for heating the inner surface of the cylinder to an elevated temperature. A card clothing 11 having surface wires 10 covers the outer surface of cylinder 1 and is held there by tension or by a heat conductor adhesive such as an epoxy filled with aluminium. As also shown in the drawings, the surface wires 10 extend through clothing 11 and are in contact with the outer surface 12 of cylinder 1.

As thermoplastic sheet 3 moves counterclockwise around cylinder 1 it is heated to its softening point by blasting with heated air provided by hot air heaters 6 and 7. The preheated thermoplastic sheet 3 is then passed into nip 13 formed by the contact between cylinder 1 and rotating cooperative means 2 (shown here also as a cylindrical roll). Cylinder 2 is similarly provided with a card clothing 17 having surface wires 15. Cylinder 2 is also power driven (not shown) and hollow to permit circulation of a heating fluid (not shown). The direction of cylinder 2 is clockwise and the surface wires 15 are bent in the same direction as surface wires 10. The surface speeds of both cylinders are identical, which is accomplished either by having them geared together or driven by electrical means from a central control panel.

Thermoplastic sheet 3 is compressed in nip 13 between the two carding surfaces with the outer surface of cylinder 1 serving as the moldings as well as the carrying surface. As the compressed thermoplastic sheet 3 passes out of nip 13 it is cooled by cold air blasts furnished by blasters 8. It is to be understood that additional cold air blasters may be utilized or that other means for cooling the compressed thermoplastic sheet 3. What is essential however is that the thermoplastic sheet 3 be cooled to a temperature below its softening point at this stage of the process. After it is so cooled, it is stripped or parted from cylinder 1 by means of take-off roll 9 as described above. The exposed tips of the metallic wires on the top rotating cylinder may be maintained at a temperature of about 140° to 160°F. At this temperature the thermoplastic sheet will be set but still soft enough to permit the take-off or stripper roll to remove the sheet from the wires without tearing. In general, if wires are used on the take-off roll they should be positioned in the direction to facilitate stripping. The recovered patterned thermoplastic sheet is thereafter collected using any number of conventional procedures and equipment.

Figure 2:
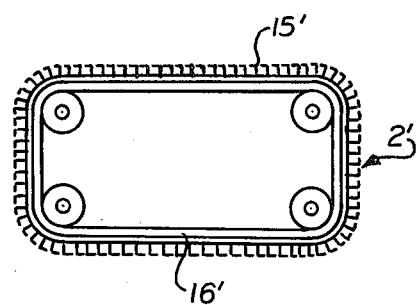
FIG. 2 illustrates an alternative form of rotating cooperative means covered with card clothing having surface wires which may be used in place of rotating cooperative means of FIG. 1.

In FIG. 2 an alternative rotating, cooperative means 2' is illustrated. Belt 16' is a flat, endless conveyor belt covered, in whole or in part, with card clothing 15' and wherein the metallic wires on the card clothing can be maintained at elevated temperatures by heating the inner surface of the conveyor belt.

Figure 3:
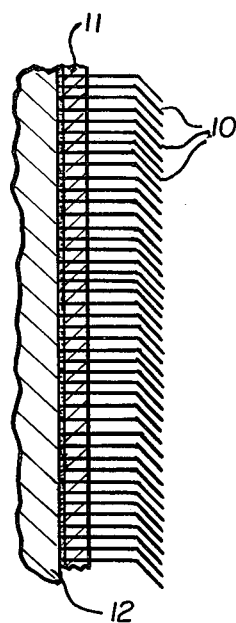
FIG. 3 is a detail view, in vertical section and on an enlarged scale, showing a fragment of the card clothing and wire members thereof illustrated in FIG. 1.

FIG. 3 shows that when card clothing is made with staples the metallic wires 10 extend through the backing cloth or rubber 11 thereby establishing intimate contact between wires 10 and the outer surface 12 of the rotating cylinder.

Figure 4:
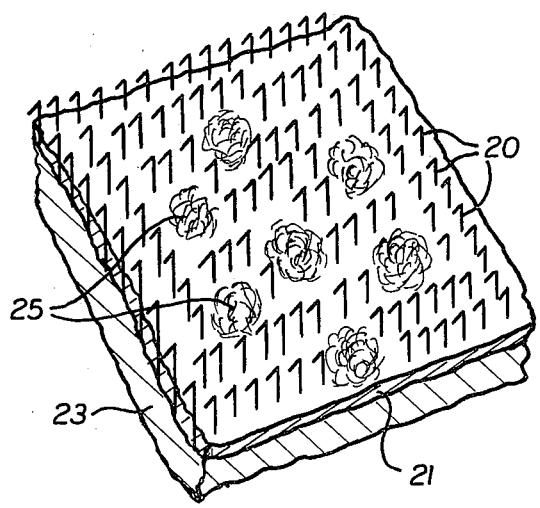
FIG. 4 illustrates a form of card clothing that may be used to cover the rotating cylinder and wherein a distinctive pattern is formed flattening or otherwise depressing selective portions of the surface wires. Distinctive patterns may also be formed by removing surface wires or by omitting some during manufacture of the clothing.

The card clothing shown in FIG. 4 illustrates a pattern formed by pressing down certain sections of the exposed metallic wires 20 to form areas 25 that will not affect the thermoplastic feed material. The cloth backing 21 and the outer surface 23 of the rotating cylinder are also shown.

It will be understood that the patterns in the final thermoplastic sheet product can be varied by a number of different procedures. Thus, for example, two or more different types of card clothing can be used on the top rotating cylinder and the cooperative rotating means. In addition, the preheating means may comprise a cut out roll of asbestos covered with aluminum foil to prevent certain portions of the feed thermoplastic sheet from being heated to the required temperatures and thereby preventing these areas from being patterned in the subsequent treatment. Another possibility would be to use as the cooperating rotating means an endless conveyor belt made of silicone rubber, gum rubber or the like and provided with a cut out design. In this way the exposed tips of the metallic areas would only pattern the thermoplastic sheet in the open areas.

The practice of the present invention also permits the manufacture of rigid vinyl sheeting that is severly undercut to trap sounds when employed as a ceiling material laminated to a non-woven, fiber glass substrate. Furthermore, it is feasible to produce wire-like lacy, discontinuous threads, with good strength in the machine direction, in the thermoplastic sheet. For such a product higher temperatures are used both in preheating and at the exposed tips of the metallic wires on the card clothing. Additional interference between the two card clothing surfaces may also be required in order to ensure that the continuity of the thermoplastic sheet being treated to destroyed. Such a product can either have alternating solid supporting sections or be laminated to a thin sheeting material which has been preheated and pressed on to the rotating cylinder, just prior to cooling, by a hot, silicone coated roll. The laminating film or sheet can be about 0.002 to 0.006 inch and can be preheated to about 300°F. Since the thermoplastic sheet being patterned is in place on the metallic wires and traveling with the rotating cylinder, the laminating film will touch only the tips of the patterned thermoplastic sheet and will be welded at those points by the heat and pressure. The laminating film may be of the same or different color to achieve various effects. It will also be understood that any of the patterned thermoplastic sheet products of this invention may be subjected to the laminating treatment described above.

The invention will be more fully understood by reference to the following illustrative embodiment:

EXAMPLE

A calendered sheet of polyvinyl chloride, approximately 0.008 inch in thickness and 96 inches in width having a conventional frosted finish is fed from a let-off roll and pressed by means of a pressure roll on to a top rotating steel cylinder covered with card clothing. The steel cylinder is 4 feet in diameter, operates at a speed of from 10 to 20 yards per minute, and has a wall thickness of approximately ⅝ inch thickness. The cylinder has an internal hollow closed baffle which forms a channel of about 1 inch away from the outer surface of the cylinder. Water heated to a temperature of up to 250°F. is continuously passed through the channel to maintain the exposed tips of the metallic wires on the card clothing at a temperature of about 150°F.

After the polyvinyl chloride sheet is on the rotating steel cylinder, and prior to any treatment to effect its surface pattern, it is subject to a blast of hot air at a temperature of about 400°F. in order to heat the polyvinyl chloride sheet to a temperature at least as high as its softening point and almost to a liquid state. Following preheating, the polyvinyl chloride sheet is passed further along the rotating steel cylinder into a nip formed by a counter rotating cooperating cylinder also covered with card clothing. This bottom cylinder or roll is about 2 feet in diameter, and it is geared to run at the same surface speed as the top roll. The exposed tip of the metallic wires on the card clothing attached to the outer surface of the bottom cylinder are maintained at a temperature of about 130°F. by internal cooling of the cylinder in the same manner described with respect to the top cylinder.

As the treated polyvinyl chloride sheet leaves the nip it is set by being blasted with cold air until it reaches a temperature of approximately 120°F. The set polyvinyl chloride sheet is then removed from the top cylinder by means of a doffer roll and then rewound on a separate roll.

The terms "pressed" or "compressed" when employed throughout this specification and in the claims with respect to the patterning of the thermoplastic sheet material by being passed through the nip formed between the two rotating carding surfaces is not intended to imply that the thickness of the thermoplastic sheet is reduced. In fact, just the opposite occurs. The thermoplastic sheet products manufactured by the process of this invention have thicknesses greater than the feed thermoplastic sheeting as a result of displacement from both of its axes. For example, polyvinyl chloride feed sheeting having a thickness ranging from about 0.006 to 0.010 inch will have a thickness ranging from about 0.025 to 0.120 inch after being patterned by the present process. There will be, however, no gain in length or loss of width.

While particular embodiments of this invention are shown above, it will be understood that the invention is obviously subject to variations and modification, both with respect to processing procedures as well as apparatus, without departing from its broader aspects. Thus, it is also possible to utilize the present invention in a conventional embossing system but replacing the embossing roll and back-up roll with two card clothing rolls. In such a procedure the thermoplastic film would be preheated on a heated drum prior to being passed through the card clothed rolls.

What is claimed is:

1. A method of continuously reproducing a non-perforated patterned sheet of thermoplastic material which comprises the following sequential steps:
    a. continuously feeding thermoplastic sheet material onto a rotating cylinder covered with card or metallic clothing having a surface of wires;
    b. heating said thermoplastic sheet on said rotating cylinder to its heat softening temperature;
    c. pressing said thermoplastic sheet against said cylinder by means of a cooperative rotating means covered with card clothing having a surface of wires without perforating said thermoplastic sheet;
    d. cooling said pressed thermoplastic sheet on said cylinder to a temperature below its heat softening temperature; and
    e. withdrawing said cooled thermoplastic sheet having a non-perforated patterned surface from said cylinder.

2. The method of claim 1 wherein said thermoplastic material is polyvinyl chloride.

3. The method of claim 1 wherein said thermoplastic material is polyethylene.

4. The method of claim 1 wherein said thermoplastic material is polypropylene.

5. The method of claim 1 wherein said thermoplastic material is polyurethane.

6. The method of claim 1 wherein said thermoplastic sheet is heated with hot air in Step (b).

7. The method of claim 1 wherein the surface wires on the cylinder are maintained at an elevated temperature.

8. The method of claim 1 wherein the surface wires on the rotating cooperative means are maintained at an elevated temperature.

9. The method of claim 1 wherein the cooperative rotating means is a cylinder covered with card clothing having a surface of wires.

10. The method of claim 1 wherein the cooperative rotating means is an endless belt a portion of which is covered with card clothing having a surface of wires.

11. The method of claim 1 wherein the pressed thermoplastic sheet is cooled with cold air in Step (d).

12. The method of claim 1 wherein at least a portion of the surface wires on the cylinder are flattened to produce a repetitive pattern in the resulting pressed thermoplastic sheet.

13. The method of claim 1 wherein the wires in said wire surfaces are bent.

* * * * *